United States Patent [19]
Houghton

[11] 4,174,859
[45] Nov. 20, 1979

[54] CONDUIT COUPLING ASSEMBLY

[76] Inventor: Joseph Houghton, 6135 DeGuise, Rochester, Mich. 48063

[21] Appl. No.: 909,096

[22] Filed: May 24, 1978

[51] Int. Cl.² ............... F16J 15/10; F16L 17/02; F16L 17/06
[52] U.S. Cl. .................. 285/111; 277/207 A; 285/345; 285/379; 285/DIG. 22
[58] Field of Search ............... 285/104, 110, 111, 336, 285/345, 349, 374, 379, 400, DIG. 11, DIG. 22; 277/178, 207 A, 212 F, 188 R, 187, 168

[56] References Cited

U.S. PATENT DOCUMENTS

| 1,683,076 | 9/1928 | Johnson et al. | 277/187 X |
| 1,757,724 | 5/1930 | Larson | 277/188 R X |
| 3,315,970 | 4/1967 | Holloway | 285/374 X |
| 3,409,227 | 11/1968 | Smith | 285/374 X |
| 3,501,172 | 3/1970 | Pickard | 285/374 X |
| 3,544,119 | 12/1970 | Glover | 277/207 A |
| 3,857,589 | 12/1974 | Oostenbrink | 285/110 |
| 3,937,497 | 2/1976 | Studer | 285/111 |
| 4,047,739 | 9/1977 | Aitken | 285/379 X |

FOREIGN PATENT DOCUMENTS 1516933   2/1968   France ................... 285/111

Primary Examiner—Mervin Stein
Assistant Examiner—Carl F. Pietruszka
Attorney, Agent, or Firm—Cullen, Sloman, Cantor, Grauer, Scott & Rutherford

[57] ABSTRACT

A conduit coupling assembly having a hub, elastomeric seal, and retainer ring for fastening and sealing a conduit which is inserted into the coupling assembly. The retainer ring has a contoured portion that aligns the conduit prior to its engagement with the seal. The seal has plural exterior, peripheral ribs that are compressed against the hub interior when the conduit is inserted. The compressed, peripheral, exterior ribs prevent leakage between the seal and the hub. The seal has an interior truncated, conical sleeve portion that stretches around the conduit as it moves into the coupling assembly creating an interference fit. The conical sleeve portion yields as the conduit first enters the coupling assembly to provide easy initial insertion. Interior peripheral ribs are formed on the seal which are compressed by the conical sleeve portion. Inserting of the conduit into the coupling causes radial outward movement by the conical sleeve. The interior compression ribs restrict the radial outward movement of the sleeve. The interior ribs are compressed, and they react against the sleeve to cause a seal between the sleeve and inserted conduit. The compressed ribs also react to cause compression of the exterior ribs against the hub.

4 Claims, 4 Drawing Figures

CONDUIT COUPLING ASSEMBLY

BACKGROUND OF THE INVENTION

Plastic conduit and fittings are currently used extensively and they have, in many instances, replaced cast iron or copper conduit and fittings. A technique used for coupling the plastic conduit has been to brush a suitable solvent on one end of the conduit and then slip the conduit into a desired fitting. The problem with the solvent coupling technique is that the solvent must be brushed on and then after the coupling, a certain set-up or dry time is required until a proper seal is made.

Slip-in coupling assemblies have been used as an alternative to the solvent technique. In the use of a slip-in coupling, a conduit is inserted into the coupling assembly and an interference fit is caused between the outer diameter of the conduit and a flexible seal that forms part of the coupling assembly. One of the problems that has existed with the slip-in coupling is that too much force is required to push the conduit into the coupling assembly and form the interference fit. The installer normally must lubricate the seal and manipulate the conduit until it finally slips into the coupling. These prior assemblies have caused the installers to spend excessive amounts of time and effort in making the connection between the conduit and coupling assembly.

Another problem exists when the plastic conduit is buried under ground as a drain or a sewer line. The ASTM requires that the slip-in coupling seal against 10 psi exterior pressure to prevent infiltration of fluid from the outside. It has been difficult to maintain ease of installation and achieve the required testing prescribed by ASTM.

Thus, the present invention relates to a conduit coupling assembly including a flexible elastomeric seal for fastening a conduit to the coupling and for sealing the coupling against interior leaking or exterior infiltration.

SUMMARY OF THE INVENTION

The invention herein relates to a conduit coupling assembly for fastening and sealing a conduit that is inserted into the coupling assembly. The coupling assembly has three component parts: a hub, a retaining ring, and a flexible elastomeric seal.

The hub or socket has a pocket or groove in which the elastomeric seal sits. It also has a ledge or stop surface that only permits a certain length of conduit to be inserted into the coupling assembly. A "V" shaped rib extends around the outer periphery of the hub near its open end. This rib mates with a complementary groove in the retainer ring.

The retainer ring is pressed onto the hub and it expands over the rib. When the retainer ring is "snapped" into position, the elastomeric seal is retained at its top by the retaining ring and at its bottom by the pocket in the hub. The retainer ring also has an axially, inwardly contoured surface which axially aligns the conduit prior to its engagement with the elastomeric seal.

The flexible elastomeric seal provides many of the important features in the present invention. The seal has two integral parts. The first part is an annular ring portion that conforms generally to one of the interior annular walls of the hub. The second part is a conically shaped, truncated sleeve portion or flapper that extends radially and axially inwardly from the hub periphery. Raised ribs extend peripherally around the exterior of the annular ring portion of the seal. When assembled, these exterior ribs are between the seal and the hub interior. Raised ribs also extend peripherally from the interior surface of annular ring portion. The conical sleeve is pushed against these interior ribs when the conduit is inserted into the coupling. One reaction force from the interior compressed ribs causes the exterior ribs to compress against the hub interior. This prevents leakage between the seal and the hub. The compressed interior ribs also react against the conical sleeve to put it into compression with the inserted conduit. The two-way reaction caused by compressing the interior ribs creates both interior and exterior sealing.

Accordingly, the present invention provides numerous advantages. First, because of the "snap-on" feature for the retainer ring, it is not necessary to solvent weld the retaining ring onto the hub. Second, the conical sleeve portion of the seal and contoured surface of the retainer ring provide easy initial insertion of the conduit which aids in the installation procedure. Third, the interior raised ribs, exterior raised ribs, and conical sleeve portion are significant in the creation of both an exterior and interior seal within the coupling assembly. Other advantages and meritorious features of the present invention will be more fully appreciated from the following detailed description and the appended claims.

DETAILED DESCRIPTION OF THE INVENTION

Figure 1:
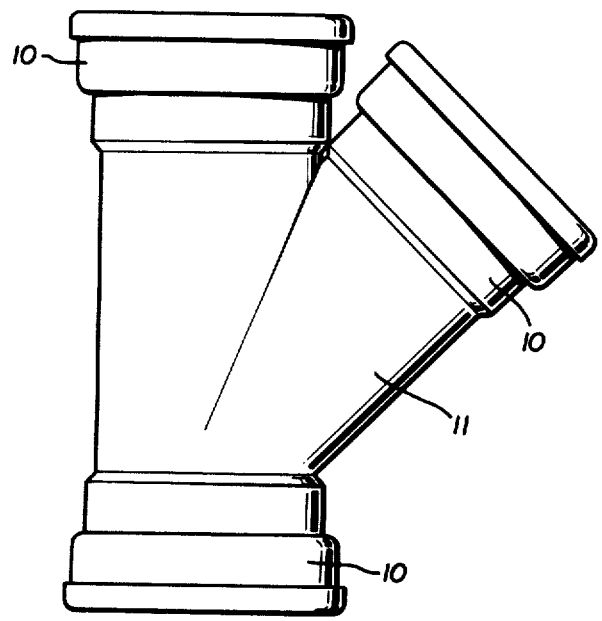
FIG. 1 is an illustration of a "Y" fitting having three integral coupling assemblies according to the principles of this invention.

FIG. 1 illustrates one of the various fitting configurations using the coupling assemblies of the present invention. A "Y" fitting 11 is shown having three coupling assemblies 10 which are an integral part of the fitting. Plastic conduit is inserted into any one or more of the coupling assemblies 10, shown in FIG. 1. The coupling assembly of the present invention is the only required element in fastening and sealing a conduit inserted into it.

The coupling assembly of the present invention may be used with other fittings than the one shown in FIG. 1. In addition to fittings, the coupling assembly is also used on straight lengths of conduit. The assemblies are shown integral with the "Y" fitting of FIG. 1, but they may be provided separately from the fittings or conduit.

Figure 2:
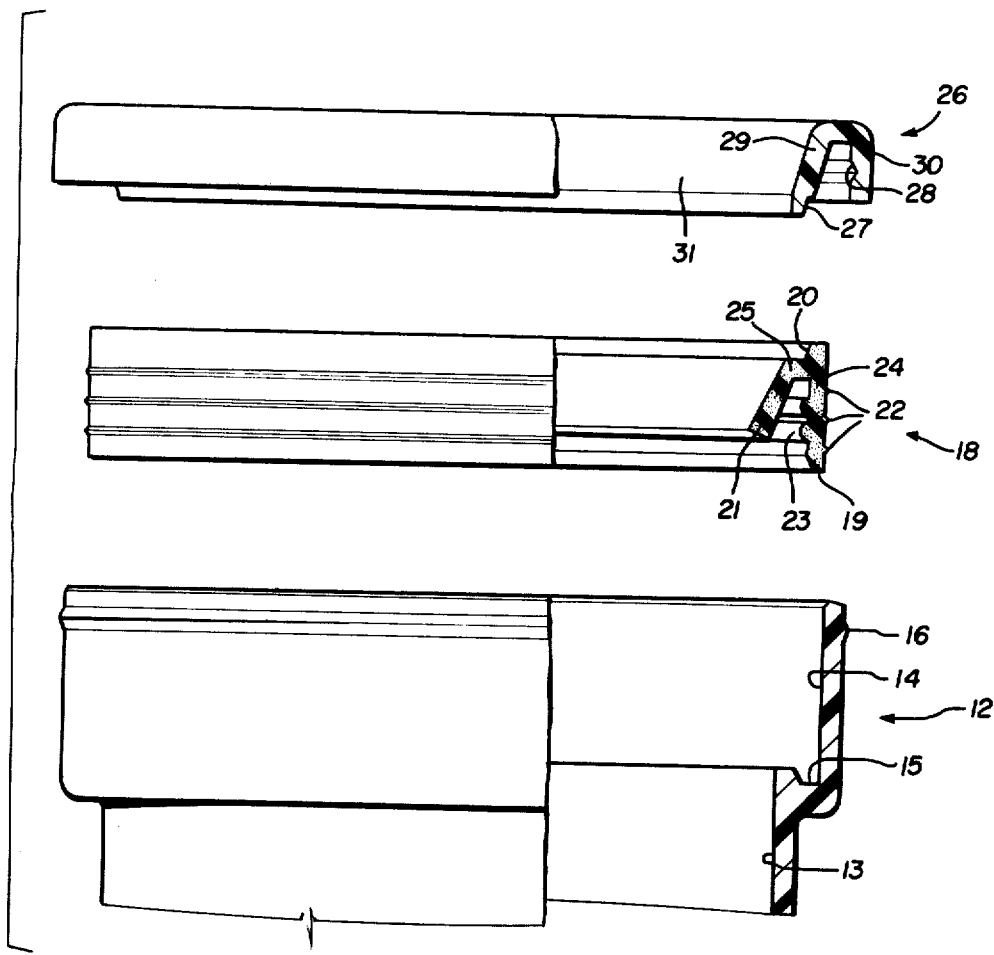
FIG. 2 is an exploded perspective view of the coupling assembly of the present invention.
Figure 3:
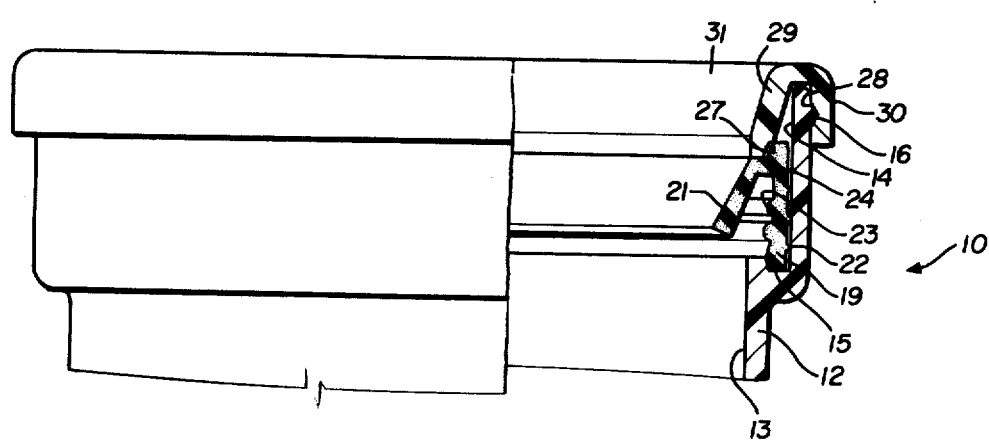
FIG. 3 is a partial cross-sectional side elevation of the coupling assembly prior to insertion of the conduit.

Referring to FIGS. 2 and 3, the coupling assembly of the present invention is illustrated. The coupling assembly 10 includes three component parts: a hub 12, an elastomeric seal 18, and a retaining ring 26. FIG. 2 illustrates the three component parts of the coupling assembly individually, and FIG. 3 illustrates an assembled coupling ready for insertion of a conduit.

Referring to FIGS. 2 and 3, the hub or socket 12 is illustrated. The function of the hub 12 is to hold the elastomeric seal 18 and to secure the retainer ring 26. Hub 12 has one annular interior wall 13 of a diameter slightly greater than the diameter of an inserted conduit. A second annular wall portion 14 is concentric with wall portion 13, but of a greater diameter. The space between the two annular wall portions 13 and 14 provides a pocket or groove 15. The elastomeric seal 18 has one end 19 that nests in the groove 15 of the hub 12. A "V" shaped rib 16 extends around the periphery of the hub adjacent its open end. This rib mates with a complementary V-shaped groove 28 in the retainer ring 26. In assembling the coupling assembly, the elastomeric seal 18 is set into the pocket 15 of the hub 12. The retainer ring 26 is pressed onto and expands over the V-shaped rib 16 of the hub 12. When the retainer ring 26 snaps into position, the elastomeric seal 18 is retained at both its top and bottom ends thereby completing the assembly.

Referring to FIGS. 2 and 3, the elastomeric seal 18 is illustrated. The elastomeric seal 18 has an annular ring portion 24 and a truncated, conically shaped, sleeve or flapper portion 21. Raised ribs 22 extend around the exterior periphery of the ring portion 24 and raised ribs 23 extend around the interior periphery of the ring portion. When assembled, the ring portion 24 is parallel to and spaced from the annular wall portion 14 of hub 12 by the raised ribs 22. The conical sleeve portion 21 extends radially inward and axially downward from its juncture 25 with the ring portion 24. As shown in FIGS. 2 and 3, the thickest part of the conical sleeve is at its free end. It is progressively thinner from its free end to its juncture 25 with the annular ring portion. This is significant because the conical sleeve will yield when the conduit is initially inserted.

When a conduit is inserted into the coupling assembly, the conical sleeve 21 yields radially outwardly compressing the ribs 23 which in turn cause ribs 22 to be compressed against annular hub wall 14. Compressed ribs 23 react to cause compression of the sleeve 21 against the conduit and compression of ribs 22 against annular wall portion 14 of hub 12.

Referring to FIGS. 2 and 3, the retainer ring 26 is illustrated. The retainer ring 26 is made of a rigid plastic material. It is generally U-shaped and has two legs 29 and 30. The function of the retainer ring 26 is to hold the elastomeric seal in position so that it does not collapse when a conduit is inserted. Contoured surface 27 of leg 29 mates with complementary surface 20 on the elastomeric seal 18 to keep the seal from folding inwardly when the conduit is inserted. When the retainer ring 26 is pushed onto the hub 12, leg 30 expands over the outside periphery of the hub 12. Retainer ring 26 is snapped onto hub 12 as leg 30 expands outwardly permitting groove 28 to snap onto V-shaped rib 16. The mating engagement of rib 16 in groove 28 holds the retainer ring 26 and elastomeric seal 18 assembled with the hub 12.

Figure 4:
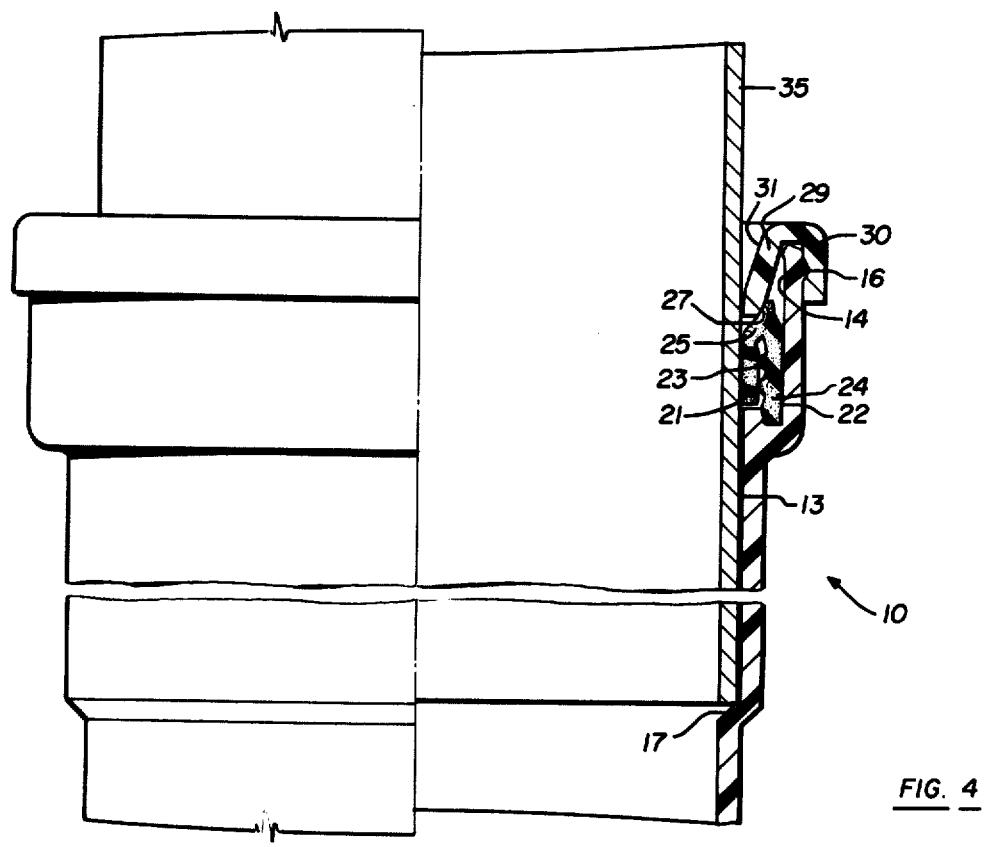
FIG. 4 is a partial cross-sectional side elevation of the coupling assembly with a conduit inserted and fastened.

The operation of the coupling assembly is best exemplified by reference to FIG. 4. Assuming it is desired to insert a conduit 35 into the coupling assembly 10, this can be easily done. The installer initially inserts conduit 35 into the open end of the coupling assembly. Contoured surface 31 of retainer ring 26 aligns the conduit 35 prior to its engagement with the elastomeric seal 18.

The conduit engages conical sleeve portion 21 of elastomeric seal 18. The conical sleeve 21 initially yields radially outwardly and stretches around the conduit 35. The sleeve 21 is thinner at its juncture 25 with the annular ring portion 24 thereby permitting the initial yielding. The inwardly sloping surface 31 of retainer ring 26 and yielding by the conical sleeve 21 aids the installer in "starting" the conduit into the coupling assembly 10.

The initial contact by the conduit 35 with conical sleeve 21 forces top end surface 20 of the seal 18 against complementary mating surface 27 of the retainer ring 26. The mating engagement between surfaces 20 and 27 prevents the elastomeric seal 18 from folding or collapsing as a result of the radially inward pulling force exerted upon seal 18 as a result of the insertion of the conduit 35. Additionally, axial friction resulting from insertion of the conduit 35 forces end 19 of the elastomeric seal 18 into sealing engagement with the pocket 15 of hub 12.

The inner diameter of the conical sleeve 21 at its free end is slightly less than the diameter of conduit 35. The conical sleeve 21 stretches and expands radially outwardly against compression ribs 23. Compression of the thick part of sleeve 21 against ribs 23 creates two reactive forces. The compressed ribs 23 force the exterior ribs 22 into compression with the annular wall portion 14 of hub 12. This creates a seal between ribs 22 and hub 12, thereby preventing leakage between the elastomeric seal 18 and the hub 12. Referring to FIG. 4, the compressed ribs 23 also exert a reactive force against the sleeve 21 to create an additional seal between the conduit 35 and the sleeve 21. Compression ribs 23 are significant in the forming of the required interior and exterior seals.

The conduit 35 can only be inserted into the coupling assembly 10 until it engages stop surface 17 of hub 12. Referring to FIG. 4, the conduit is shown inserted into the coupling assembly of the present invention. While the coupling assembly is shown as an integral part of the fitting, it may be made for separate attachment.

It will be apparent to those skilled in the art that the foregoing disclosure is exemplary in nature rather than limiting, the invention being limited only by the appended claims.

I claim:

1. In a conduit coupling assembly which couples a conduit that is inserted into said coupling assembly, said coupling assembly comprising:
   (a) an annular hub having a first annular interior wall of a diameter slightly greater than the diameter of an inserted conduit and a second annular interior wall concentric with said first interior wall and having a diameter greater than the diameter of said first interior wall, a portion of said hub connecting said first and second annular walls defining an interior groove portion and a circumferential rib portion extending around the exterior of the hub adjacent a conduit-receiving open end of said hub;
   (b) a resilient seal mounted in said interior groove portion of said hub, said resilient seal having a truncated conical sleeve portion and an annular ring portion, said conical sleeve portion joined to said ring portion at one end and said sleeve portion extending progressively, axially away from said one end of said hub and radially inwardly toward the axis of said hub to a second free end, said one end of said conical sleeve portion being thinner than said second free end of said sleeve portion, said second end of said sleeve portion having an internal diameter slightly less than the external diameter of said conduit inserted into the coupling assembly, first raised circumferential rib portions extending around an outer periphery of said ring portion between said ring portion and said second annular interior wall of said hub, second rib portions extending around an inner circumference of said ring portion between said ring portion and said conical sleeve portion; and (c) a retainer ring adapted to be mounted on said open end of said hub, said retainer ring having an exterior hub engaging portion and an interior seal engaging portion, a radially inwardly opening circumferential groove in said hub engaging portion mating with said rib portion on said hub to retain said ring in place on said hub, said seal engaging portion engaging and holding said one annular end of said seal ring portion, said conduit being inserted into said coupling assembly and said conical sleeve portion yielding radially outwardly to compress said second rib portions, compression of said second rib portions reacting to cause compression of said sleeve portion against said conduit and compression of said first rib portions against said second annular interior wall of said hub.

2. The conduit assembly of claim 1 wherein said seal engaging portion of said retainer ring has a surface that mates with a complimentary surface on said seal ring portion to prevent said seal from collapsing radially inwardly when said conduit is inserted into said coupling assembly.

3. The coupling assembly of claim 1 wherein said hub has a stop surface that limits the extent of axial insertion of said conduit.

4. The coupling assembly of claim 1 wherein said retainer ring is provided with an aligning surface for axially aligning said conduit prior to its engagement with said seal.

* * * * *